(12) United States Patent
Cai

(10) Patent No.: US 10,388,130 B2
(45) Date of Patent: Aug. 20, 2019

(54) ANTI-THEFT METHOD AND SYSTEM FOR BABY STROLLER

(71) Applicant: Junhao Cai, Guangdong (CN)

(72) Inventor: Junhao Cai, Guangdong (CN)

( * ) Notice: Subject to any disclaimer, the term of this patent is extended or adjusted under 35 U.S.C. 154(b) by 0 days.

(21) Appl. No.: 16/184,336

(22) Filed: Nov. 8, 2018

(65) Prior Publication Data

US 2019/0080574 A1 Mar. 14, 2019

Related U.S. Application Data

(63) Continuation of application No. PCT/CN2016/099684, filed on Sep. 22, 2016.

(30) Foreign Application Priority Data

May 23, 2016 (CN) .......................... 2016 1 0344435

(51) Int. Cl.
| | | |
|---|---|---|
| *B62B 9/00* | (2006.01) | |
| *G08B 21/02* | (2006.01) | |
| *G08B 13/196* | (2006.01) | |

(52) U.S. Cl.
CPC .............. *G08B 13/196* (2013.01); *B62B 9/00* (2013.01); *G08B 21/02* (2013.01)

(58) Field of Classification Search
CPC .......... G08B 13/196; G08B 21/02; B62B 9/00
See application file for complete search history.

(56) References Cited

U.S. PATENT DOCUMENTS

| 2012/0120248 A1* | 5/2012 | Han | H04N 7/18 348/169 |
|---|---|---|---|
| 2014/0130254 A1* | 5/2014 | Jeong | A47D 9/02 5/109 |
| 2015/0156567 A1* | 6/2015 | Oliver | H04W 4/80 340/870.07 |
| 2015/0229906 A1* | 8/2015 | Inacio De Matos | G05D 1/0246 348/46 |

FOREIGN PATENT DOCUMENTS

| CN | 102842209 A | 12/2012 |
|---|---|---|
| CN | 104322059 A | 1/2015 |
| CN | 104326011 A | 2/2015 |
| CN | 204256893 U | 4/2015 |

(Continued)

*Primary Examiner* — Tracy Y. Li
(74) *Attorney, Agent, or Firm* — Wayne & Ken, LLC; Tony Hom

(57) ABSTRACT

An anti-theft method and system for baby stroller includes: acquiring baby information in a baby stroller; turning on a camera to perform face recognition on a baby in the baby stroller if the baby information is not within a preset parameter range; obtaining a face information of a baby picker in a shooting range of the camera, and if the face information of the baby picker is not within a preset face information, issuing an alarm. The camera is activated by the pressure detecting device on the baby stroller for face recognition, and the result of face recognition and the faces within the original database are used to identify whether it is a safe person. By intelligent alarming, on the one hand, theft of the baby can be prevented, and on the other hand, awakening the baby under reasonable circumstances can be avoided. An anti-theft device is also provided.

6 Claims, 2 Drawing Sheets

(56) References Cited

FOREIGN PATENT DOCUMENTS

| | | |
|---|---|---|
| CN | 104616461 A | 5/2015 |
| CN | 105005331 A | 10/2015 |
| CN | 204832981 U | 12/2015 |
| CN | 105825627 A | 8/2016 |
| KR | 100970610 B1 | 7/2010 |
| KR | 101262742 B1 | 5/2013 |

\* cited by examiner

ANTI-THEFT METHOD AND SYSTEM FOR BABY STROLLER

CROSS-REFERENCE TO RELATED APPLICATIONS

This application is a continuation of International Patent Application No. PCT/CN2016/099684, filed on Sep. 22, 2016, which claims the benefit of priority from Chinese Application No. 201610344435.7, filed on May 23, 2016. The content of the aforementioned applications, including any intervening amendments thereto, are incorporated herein by reference.

TECHNICAL FIELD

The disclosure relates to baby-care products, and in particular to anti-theft method and system for baby stroller.

BACKGROUND

With the development of economy and technology, people pay more and more attention to baby care technology, and baby stroller has become one of the indispensable tools for baby care. However, today's baby strollers have certain defects in safety, causing some safety accidents, and are simple in function and unable to meet the needs of people in modern life.

At present, the baby strollers used mainly have the following defects: they cannot prevent the baby from being lost, and some protective measures cannot be automatically started when the baby is too far away from the caretaker. Since baby is more sensitive to noise, direct warning may awake the baby in the event of a false alarm.

SUMMARY

Based on the above situation, the present disclosure proposes an anti-theft method for baby stroller, in which it is determined whether to activate the camera for monitoring protection by judging whether the position difference between the baby stroller and the user exceeds a threshold. Load information or infrared sensing information of the baby stroller are obtained, and if the load information or the infrared sensing information is not within a preset parameter range, face recognition is turned on; and face information of the baby picker is obtained, and if the face information is not within a preset face information range, the user is reminded if protection is needed.

The disclosure provides an anti-theft method for baby stroller including: obtaining baby information in a baby stroller; turning on a camera to perform face recognition on a baby in the baby stroller if the baby information is not within a preset parameter range; obtaining a face information of a baby picker in a shooting range of the camera, and issuing an alarm if the face information of the baby picker is not within a preset face information.

When it is detected that the user is not within a first preset distance range of the baby stroller, the camera is turned on for monitoring.

The method for issuing an alarm includes: obtaining a first geographical location information of the baby stroller, and notifying public facility cameras in a second preset distance range to perform adjustment and shooting according to the first geographical location information.

The method for performing the adjustment and shooting includes: acquiring a second geographical location information of current public facility cameras, and adjusting corresponding cameras to face the first geographic location.

An alarm triggering time is recorded when the first geographical location information is acquired; and shooting fragments of the public facility cameras within a preset time range are obtained according to the alarm triggering time.

Meanwhile, the present disclosure further provides a anti-theft device for baby stroller, the device including: a baby information obtaining module, an image acquisition module, a data processing module, and an alarm module; the data processing module is connected with the baby information obtaining module, the image acquisition module and the alarm module; the baby information obtaining module is configured to obtain information about whether the baby is in the baby stroller; the data processing module is configured to determine whether the baby information acquired by the baby information obtaining module is within a preset parameter range, if not, obtaining, by the image acquisition module, a face information of the baby picker in the shooting range, and when the face information of the baby picker is not within a preset face information range, notifying the alarm module to perform an alarm reminder; the image acquisition module is configured to acquire image information in a shooting range; the alarm module is configured to perform an alarm according to information of the data processing module.

Compared with prior art, the anti-theft method for baby stroller provided in the disclosure is simple to operate. A pressure detecting device or an infrared detecting device on the baby stroller is used to activate the camera for face recognition, and the result of the face recognition together with the faces in the original database are used to identify whether it is a safe person. The intelligent alarm can prevent the baby from being stolen on the one hand, and avoid waking the baby under reasonable circumstances. At the same time, by coordinating with public facilities, the police can help dealing with the case quickly by scheduling the scenes taken by the surrounding cameras.

DETAILED DESCRIPTION OF EMBODIMENTS

At present, the baby stroller with anti-theft functions either adopts fingerprint unlocking function or environmental detection for guarding of the baby stroller. Face recognition, infrared detection, pressure detection, etc. may also be adopted. As long as certain conditions are met, it will automatically ring to alarm, which does not take into account whether the baby would be awakened by the ring. While the baby is just growing, being startled by the ring will seriously affect the normal development and healthy growth of the baby.

At the same time, in order to achieve the above functions, the baby stroller needs to have a battery and have a certain amount of power. Among them, turning on the camera and capturing the face at any time for recognition operation is a very power-consuming process. In order to solve the above problems, the present invention proposes an anti-theft method for baby stroller.

The solution of the present invention will be described in detail below in conjunction with preferred embodiments thereof.

Figure 1:
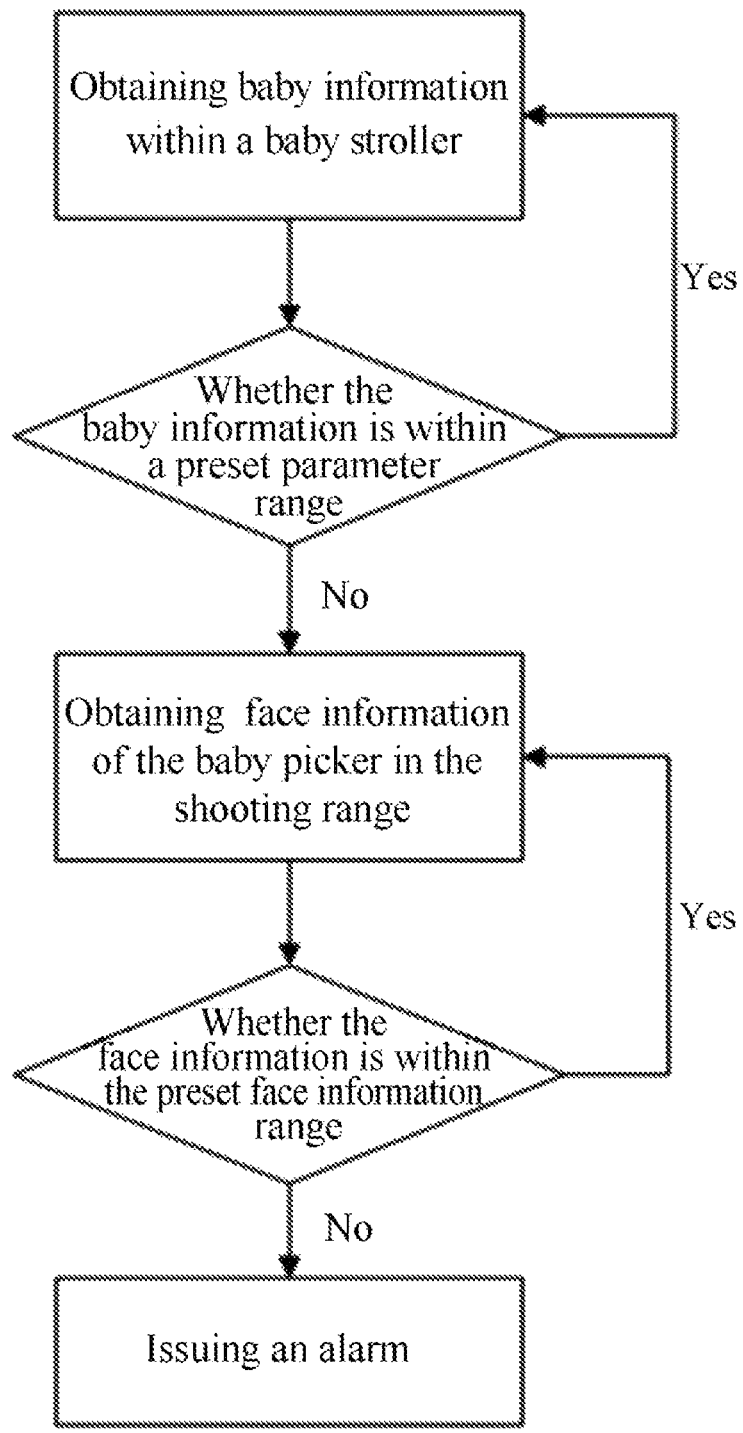
FIG. 1 is a flow chart of an embodiment of an anti-theft method for baby stroller.

FIG. 1 shows an anti-theft method for baby stroller, including:

S101: Acquiring baby individual information in the baby stroller; when the baby information is not within the preset parameter range, turning on the camera and perform face recognition.

The individual information of the baby includes weight information or body temperature information of the baby in the vehicle, where weight information can be detected by the pressure detecting device, and the infrared sensing information can be detected by the infrared detecting device; when the baby's weight information or infrared sensing information is not within a preset parameter range, the camera is turned on. The preset parameter here comprises a weight range of 3 to 20 kg, which can be set according to the specific conditions of each country, including but not limited to the currently set parameter range; the infrared sensing information includes a positive infrared sensing information which is indicated when a baby is detected in the baby stroller and a negative infrared sensing information which is indicated when a baby is not detected in the baby stroller, and the negative infrared sensing information is not within the preset parameter range; when the baby information is not within the preset parameter range, it is proved that someone has picked up the baby, and the camera is turned on for monitoring. Since the battery carried by the baby stroller has a limited amount of power and the shooting fragments of the camera occupy a certain amount of storage space, the camera is activated by sensing, which saves power in this way. Of course, there are other ways to detect if the baby is in the baby stroller or when it is suddenly picked up, such as turning on the camera to shoot the baby. In order to prevent someone from putting heavy objects into the baby stroller in replace of the baby, the camera can be turned on to take pictures of the baby's face and perform face recognition. The user is notified or an alarm is issued when the baby's face cannot be recognized.

As a better implementation, when detecting that the user is not within the preset distance range of the baby stroller, the camera is turned on to perform face recognition of the baby in the baby stroller, and when the detected baby face information does not match the pre-stored baby information, an alarm is issued or the user (user, referring to the baby stroller user, usually a family member or a babysitter) is reminded. Here, the pre-stored baby information is baby's facial information which is stored in advance by the user or family member on the baby stroller or a user terminal.

Since the user is in the vicinity of the baby stroller, camera monitoring is unnecessary, which would otherwise waste power. Therefore, the camera can automatically monitor the baby stroller only when the user is away from the baby stroller for a certain distance. The user here refers to the user holding the mobile terminal or wearing a Bluetooth bracelet. To detect whether it is within the first preset distance range, Bluetooth ranging, satellite positioning ranging, etc. can be used. Bluetooth ranging mainly uses the strength of the Bluetooth signal to determine the specific distance. The Bluetooth beacon can be installed on the baby stroller, and the distance can be measured through the Bluetooth device or the Bluetooth bracelet on the user's mobile phone and the signal strength of the Bluetooth beacon; the satellite positioning can be used to obtain the position coordinates of the baby stroller and the user mobile terminal position coordinates, and then the specific distance can be calculated.

S102: Acquiring face information of the baby picker in the shooting range, and if the face information is not within the preset face information range, an alarm reminder is issued.

In S101, the baby is not within the baby stroller; the camera captures the face of the person who took the baby out of the baby stroller, and performs face recognition. Since the baby stroller pre-stores information about some safety members, for example, the face information of the family members of the baby and the babysitter, the baby stroller needs to be alerted when the recognized face is not in these safe members. Face recognition sometimes has some errors (or identification errors or camera misidentification due to dust, etc.). In the case that the face information is not obtained or the face information does not match with the pre-stored information, the fingerprint information of the baby picker may be obtained, and if the fingerprint information is not within the range of the preset fingerprint information, an alarm is issued.

Under normal circumstances, the baby stroller alarm mainly uses a police alarm or informs the family members who use the baby stroller. The use of alarm sounds will have a louder sound, and the baby is in a period of just growing. Being startled by the police alarm will seriously affect the normal development and healthy growth of the baby.

In order to avoid some normal users' erroneous operations which causes a warning and awakens the baby, the foregoing alarm method is specifically: acquiring the first geographical location information of the current baby stroller, and notifying the public facility cameras in the second preset distance range according to the first geographical location information to perform adjustment and shooting; the specific method of performing adjustment and shooting is: acquiring the second geographic location information of the current public facility cameras and pointing the corresponding cameras to the first geographic location. In this way, even if a baby theft occurs, the corresponding situation can be captured more clearly. The public facility cameras are a camera set for public safety, such as surveillance cameras set up by some bus stations for monitoring theft, surveillance cameras set up in the mall for theft prevention, etc.; these cameras take a round-trip shooting of surrounding scenes to achieve the goal of patrol monitoring. However, these cameras only shoot at a predetermined time and trajectory, and it is often difficult to play an important role in the event of an unexpected event. In the present invention, after detecting theft incident, the alarm information and the first geographical location information of the stolen baby stroller is uploaded to the public network, and the server of the public network acquires the second geographical location information of the public facility cameras in the second preset distance range of the first geographical location information (for example, in the range of 2 m-100 m, may be set according to the actual scenes) (there may be multiple cameras in the range), then the first geographical location information and each second geographical location information are connected to a ray, and then with each second geographic location as the origin, all cameras are adjusted to face the first geographic location. This avoids the situation where the capture of important segments is missed due to the shooting angle of the camera.

The alarm triggering time is also acquired while obtaining the first geographical location information of the current baby stroller. According to the alarm triggering time, shooting fragments of the public facility cameras within the preset time range is acquired. In the event of a theft, the police can view the shooting fragments before and after the incident based on the alarm triggering time to lock the suspect to save time.

Figure 2:
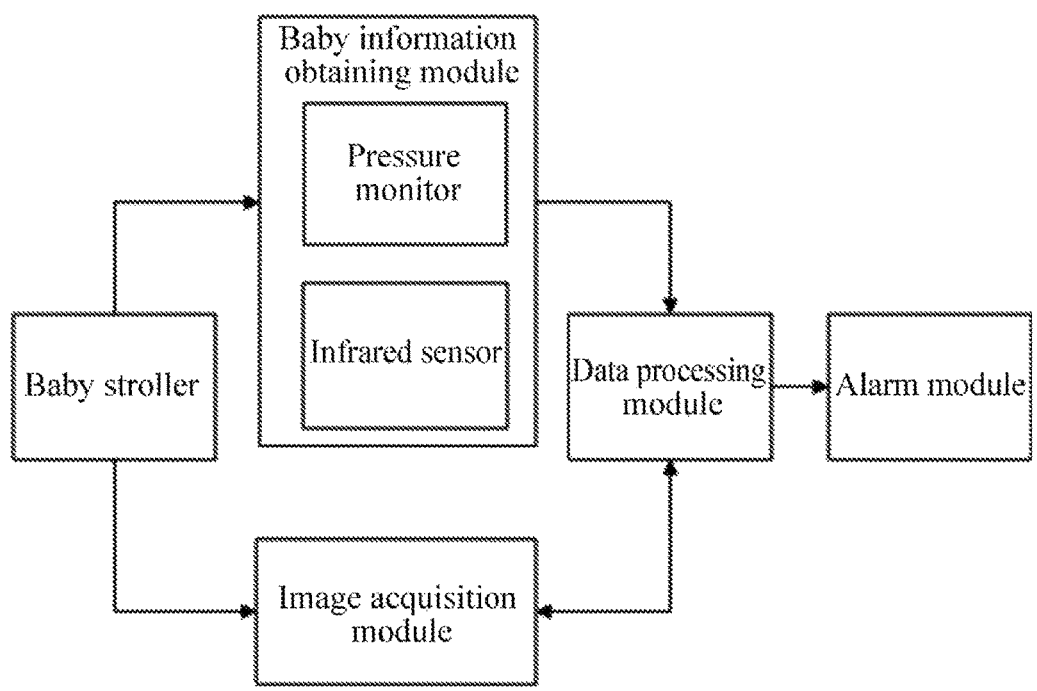
FIG. 2 is a schematic diagram of an embodiment of an anti-theft system for baby stroller.

A schematic structural view of an embodiment of an anti-theft device for baby stroller of the present invention is shown in FIG. 2.

An anti-theft device for baby stroller is disclosed, the device comprising: a baby information obtaining module (including a pressure detector and an infrared sensor), an image acquisition module, a data processing module and an alarm module; the data processing module is connected with the baby information obtaining module, the image acquisition module and the alarm module respectively;

The baby information obtaining module is configured to acquire individual information of the baby and includes a pressure detector module and an infrared detecting module; the pressure detector module is configured to detect the weight information of the baby, and feed back the weight information to the data processing module; the infrared detecting module is configured to detect whether the baby is within the seat and feed back the information to the data processing module;

the data processing module is configured to determine whether the baby information acquired by the baby information obtaining module is within a preset threshold, and if not, obtain, by the image acquisition module, face information of the baby picker in the shooting range; when the face information is not within the preset face information range, the alarm module is notified to perform an alarm reminder.

the image acquisition module is configured to acquire image information within a shooting range.

the alarm module is used to issue an alarm based on information from the data processing module.

The data processing module is further configured to turn on the camera and perform face recognition on the baby in the baby stroller when it is detected that the user is not within the first preset distance range of the baby stroller, and to issue an alarm or alert the user when the detected baby face information does not match with the pre-stored baby face information.

At the same time, a geographic location acquisition module is further disposed in the anti-theft device for baby stroller, which is configured to acquire a first geographic location information of the current baby stroller, and notify the public facility cameras in the second preset distance range according to the first geographic location information to perform adjustment and shooting; the specific method of performing adjustment and shooting is to obtain the second geographical location information of the current public facility cameras, and point the corresponding cameras to the first geographical location. In this way, even if a baby theft occurs, the corresponding situation can be captured clearly. The geographic location acquisition module can use satellite positioning systems such as Beidou, GPS, GLONASS, and Galileo. The alarm triggering time is also acquired while obtaining the first geographical location information of the current baby stroller. According to the alarm triggering time, shooting fragments of the public facility cameras within the preset time range is acquired. In the event of a theft, the police can check the shooting fragments before and after the incident according to the alarm triggering time to identify the suspect, which saves the time for handling the case.

In this embodiment, the operation principle of each module is consistent with the effect brought by the method embodiment of the present invention, and will not be repeated here.

The above-described embodiments are merely illustrative of several embodiments, and the description thereof is not to be construed as limiting the scope of the invention. It should be noted that a number of variations and modifications may be made by those skilled in the art without departing from the spirit and scope of the invention. Therefore, the scope of the application should be defined by the appended claims.

What is claimed is:

1. An anti-theft method for baby stroller, comprising:
obtaining baby information in the baby stroller;
turning on a camera to perform face recognition on a baby in the baby stroller if the baby information is not within a preset parameter range; and
obtaining a face information of a baby picker in a shooting range of the camera, and if the face information of the baby picker is not within a preset face information, issuing an alarm;
wherein the method of issuing the alarm comprises:
obtaining a first geographical location information of the baby stroller, and
notifying public facility cameras in a second preset distance range to perform adjustment and shooting according to the first geographic location information;
wherein the method of performing adjustment and shooting comprises:
obtaining a second geographical location information of current public facility cameras, and
adjusting corresponding cameras to face the first geographic location.

2. The anti-theft method of claim 1, wherein, when it is detected that a user is not within the first preset distance range of the baby stroller, the camera is turned on to perform face recognition on the baby in the baby stroller, and when the recognized baby face information does not match pre-stored baby face information, an alarm is issued or the user is warned.

3. The anti-theft method of claim 1, wherein an alarm triggering time is recorded when the first geographical location information is obtained; and shooting fragments of the public facility cameras within a preset time range are obtained according to the alarm triggering time.

4. An anti-theft device for baby stroller, comprising:
a baby information obtaining module;
an image acquisition module, a data processing module; and
an alarm module;
wherein the data processing module is connected with the baby information obtaining module, the image acquisition module and the alarm module; the baby information obtaining module is configured to obtain information about whether the baby is in the baby stroller; the data processing module is configured to determine whether the baby information acquired by the baby information obtaining module is within a preset parameter range, if not, obtaining, by the image acquisition module, a face information of the baby picker in the shooting range, and when the face information of the baby picker is not within a preset face information range, notifying the alarm module to perform an alarm reminder; the image acquisition module is configured to acquire image information in a shooting range; the alarm module is configured to perform an alarm according to information of the data processing module; the alarm module is configured to acquire a first geographic location information of the baby stroller, and notify public facility cameras to perform adjustment and shooting within a second preset distance range according to the first geographic location information;

wherein the method of performing adjustment and shooting comprises:

acquiring a second geographical location information of current public facility cameras; and adjusting corresponding cameras to face the first geographic location.

5. The anti-theft device of claim 4, wherein the data processing module is further configured to turn on the camera to perform face recognition on the baby in the baby stroller when it is detected that a user is not within the first preset distance range of the baby stroller, and issue an alarm or warn the user when the recognized baby face information does not match the pre-stored baby face information.

6. The anti-theft device of claim 4, wherein an alarm triggering time is recorded when the first geographical location information is acquired; and shooting fragments of the public facility cameras within a preset time range are obtained according to the alarm triggering time.

* * * * *